(12) United States Patent
Zanier

(10) Patent No.: US 7,263,786 B1
(45) Date of Patent: Sep. 4, 2007

(54) HEIGHT GAUGE

(75) Inventor: Adriano Zanier, Prilly (CH)

(73) Assignee: Tesa SA, Renens (CH)

( * ) Notice: Subject to any disclaimer, the term of this patent is extended or adjusted under 35 U.S.C. 154(b) by 0 days.

(21) Appl. No.: 11/448,618

(22) Filed: Jun. 7, 2006

(30) Foreign Application Priority Data

Apr. 19, 2006 (DE) .................. 20 2006 006 323 U

(51) Int. Cl.
*G01B 5/02* (2006.01)
(52) U.S. Cl. .......................................... 33/832; 33/833
(58) Field of Classification Search .................. 33/832, 33/833
See application file for complete search history.

(56) References Cited

U.S. PATENT DOCUMENTS 6,745,488 B2 * 6/2004 Jordil et al. .................. 33/832
6,763,604 B2 * 7/2004 Jordil et al. .................. 33/832

FOREIGN PATENT DOCUMENTS

| CH | 667 726 A5 | 10/1988 |
| EP | 0 233 736 A1 | 8/1987 |
| EP | 0 421 922 A1 | 10/1989 |
| EP | 0 579 691 B1 | 7/1996 |

* cited by examiner

*Primary Examiner*—Yaritza Guadalupe-McCall
(74) *Attorney, Agent, or Firm*—Pearne & Gordon LLP

(57) ABSTRACT

A vertical length measuring device (100) is disclosed that comprises a vertical guide (20), at least one carriage (35) that is led vertically by the guide (20), and a driving organ (130, 150) for the at least one carriage (35). A housing (120) placed around the vertical guide (20), the carriage (35) and the driving organ (130, 150), has a longitudinal opening (121), and is fastened at a foot (33) of the length measuring device (100). A measuring head (40) is placed outside the housing (120) and is connected with the carriage through the opening (121) of the housing (120). The invention is characterized in that behind the opening (121) of the housing (120) inside the housing (120), a baffle (125) is placed. This advantageously prevents penetration of oil, water and dirt from outside.

10 Claims, 3 Drawing Sheets

HEIGHT GAUGE

REFERENCE DATA

This application claims priority form German utility model application No 20,2006,323.4 filed on Apr. 19, 2006 in the name of Tesa SA, the contents whereof are hereby incorporated by reference.

TECHNICAL FIELD

The invention concerns a height gauge (vertical length measuring device) according to the preamble of the independent claim.

STATE OF THE ART

Measuring apparatus for measuring linear dimensions are used in workshops for the manufacture of mechanic parts, to measure and control the latter's dimensions.

Purpose-specific apparatus have become known where a slider is moved up and down on a mounting plate. This slider includes a measuring probe that is set onto the object to be measured. The slider's position determined in this way and thus the measuring value, are evaluated and displayed over an electronic measuring system.

Normally, the slider is provided with a counterweight over a cable pulley, so that its own weight cannot have any influence during measuring. The movement of the slider on the column occurs through a driving unit that is either attached directly to it or that actuates the cable pulley.

In EP-A1-0 223 736, an apparatus for measuring height is for example described, for example, wherein the measuring head bearing the measuring probe is mounted movably in the direction of measuring and relatively in relation to the carriages and is held by a counterweight inside the apparatus in a position corresponding to the zero measuring by a positioner with an elastic connection. On this apparatus, the measuring head's protection housing is linked integrally with the carriage, and the device used for moving the latter is of one piece with the same. The system for creating the equilibrium inside the carriage allows it to be protected against the ill effects of the oscillations caused through operating the sliding device.

In another apparatus for measuring heights, described in CH-A5-667 726, the measuring head bearing the measuring probe is mounted movably in the direction of the measuring on the carriage and is held in equilibrium on the latter and in this direction through the antagonistic forces of two pressure springs placed opposite on both sides of the carriage. These are also used to exert a probing force on the part to be measured during the measuring process. On the apparatus, the protection housing of the measuring head is fastened on the carriage and the latter is moved along the guiding rails through a movement transmission system with rolls and an endless driving belt that is operated through a powering unit actuated placed on a support.

EP-A1-0 421 922 concerns a device for measuring distances, consisting of a rail, of a slider placed on this rail and having a first partial slider in the form of a regulatory organ and a second partial slider embodied as a measuring element with measuring sensor, of connecting organs between this first and second partial sliders and of a removable braking gear for locking the first partial slider on the rail.

A measuring apparatus for measuring linear dimensions is known from EP-B1-0 579 691. The measuring apparatus includes a support, a guiding rail fastened fixedly to the support and which is oriented in parallel to a measuring device, a movable part with means for moving along the guiding rail, a measuring head with a measuring probe, connected with the movable part, a device for recording the position of the measuring probe along the guiding rail, a housing and a protective device in order to protect at least the measuring head against shocks and strains caused by the driving of the movement generator and its transmission means.

All these embodiments have the disadvantage that they provide no protection against contaminants. When working in a workshop, however, there are involuntary sprayings of oil, water and other substances that also end up on the measuring means of the column. The measuring means consist of a line rule, for example of glass with contrasting graduation marks and a first position probe that can be electro-optical.

It has already been suggested to provide a housing with a longitudinal opening around the vertical guide, the rule and the carriage. The measuring head lies outside the housing and the measuring head is connected with the inside carried through the longitudinal opening. It has however unfortunately been shown that this longitudinal opening does not provide sufficient protection against soiling since impurities can still enter unhindered the opening on the optical rule. Cleaning is even made more difficult since the housing has to be removed in order to clean the inside parts.

REPRESENTATION OF THE INVENTION

It is an aim of the invention to propose a height gauge (vertical length measuring apparatus) of the kind mentioned previously that has improved protection against contamination of the optical rule and of the inside parts.

It is a further aim of the invention to propose a height gauge that has good properties against vibrations and other external influences such as shocks.

According to the invention, these aims are achieved with an embodiment of the preamble in that between the opening of the housing inside the housing there is a baffle that prevents the penetration of oil, water and dirt from outside.

Advantageously, penetration of dirt in the housing is effectively prevented by the baffle. The shape of the baffle is in principle arbitrary, as long as the purpose is fulfilled to separate the longitudinal opening and the guide from one another and dirt entering through the opening remains stuck on the baffle and cannot affect/damage the mechanism and the optics.

Further advantageous embodiments are indicated in the sub-claims.

It is thus possible to have for example between the measuring head outside the housing and the at least one carriage inside the housing a curved arm so that the baffle does not disturb the movement of the measuring head. If the housing in fastened state has only one opening and the housing is screwed onto the foot, there is generally less risk of soiling occurring.

Simultaneously, the carriage inside the housing of the height gauge can have an additional housing, which gives additional security against soiling.

A table console with a display for displaying the measuring results can also be provided outside the guiding column, the housing of the table console being made watertight.

The connections of the table console are led through the foot to the inside of the housing, so that no further openings are necessary in the housing. The connections of this crank are led either through the foot to the inside of the housing and/or to an available table console, so that similarly no further openings are required in the housing.

The housing is advantageously made of one piece and is fastened only to the foot of the height gauge, so that external shocks are not directly transmitted to the inside.

SHORT DESCRIPTION OF THE FIGURES

The invention will be explained in more detail on the basis of the attached figures, in which.

WAYS OF REALIZING THE INVENTION

Figure 1:
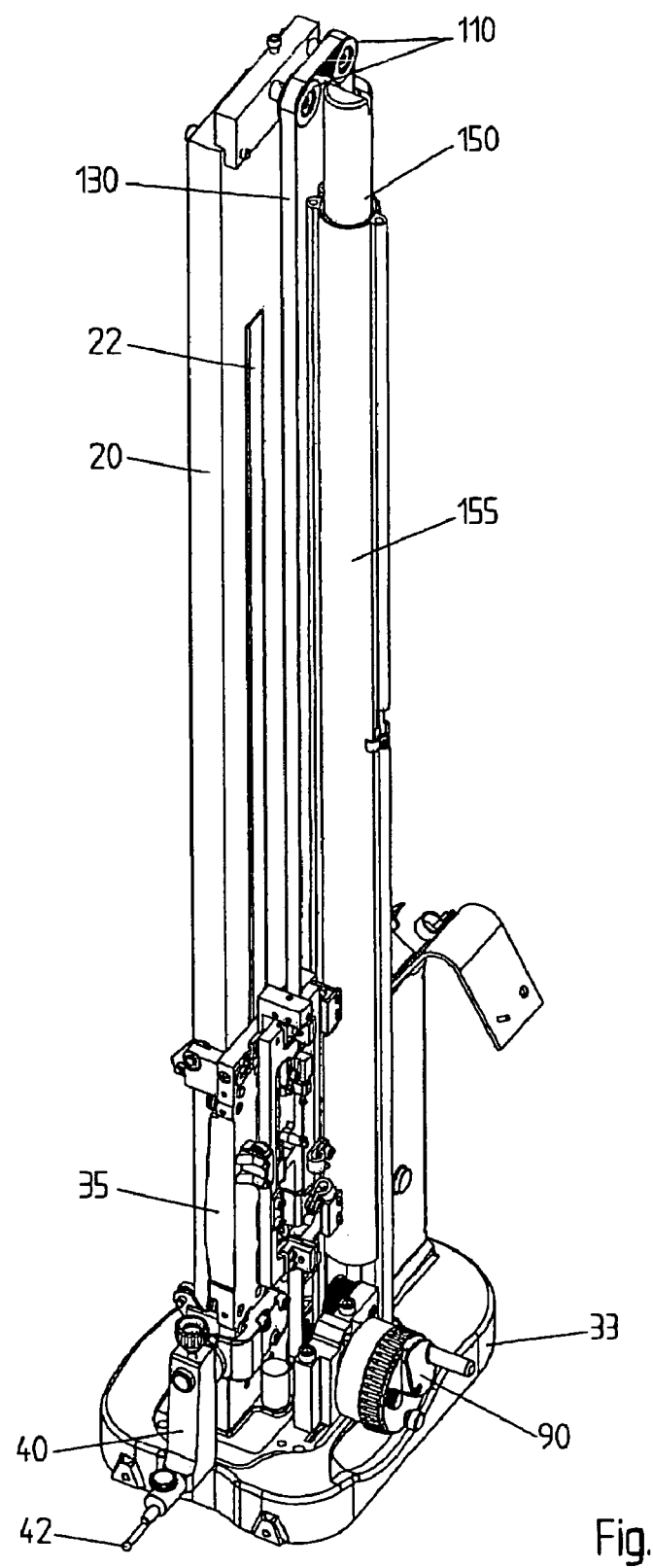
FIG. 1 is a first representation of an inventive height gauge without housing.

FIG. 1 shows a height gauge 100 according to the invention. The height gauge has a vertical guide 20 on which a position encoder is attached. The position encoder advantageously consists in an optical rule 22 and of its associate optical reader. The invention could however also include encoders of different nature, like for example a magnetoresistive position encoder. Through the guide 20, a carriage 35 is guided vertically. The carriage 35 works together with the rule 22 in such a way that measuring values can be read and processed by a circuit, not represented, and displayed on a console 180, represented in FIG. 2. The carriage 35 is connected with a driving organ, which in the shown example consists of a driving belt 130. On the upper end of the column, the driving belt 130 is re-directed over rolls 110 and is connected with a counter-weight 150 that is led in a guiding conduit 155. On the lower side, the driving belt 130 passes over a crank 90. By manually adjusting the crank 90k, the carriage 35 is adjusted by the user and performs the length measurements. Electric powering units are also possible within the frame of the invention. The length measuring device 100 has a lower foot 33 and a measuring head 40 connected with the carriage 35 and provided with a probe arm 42.

Figure 2:
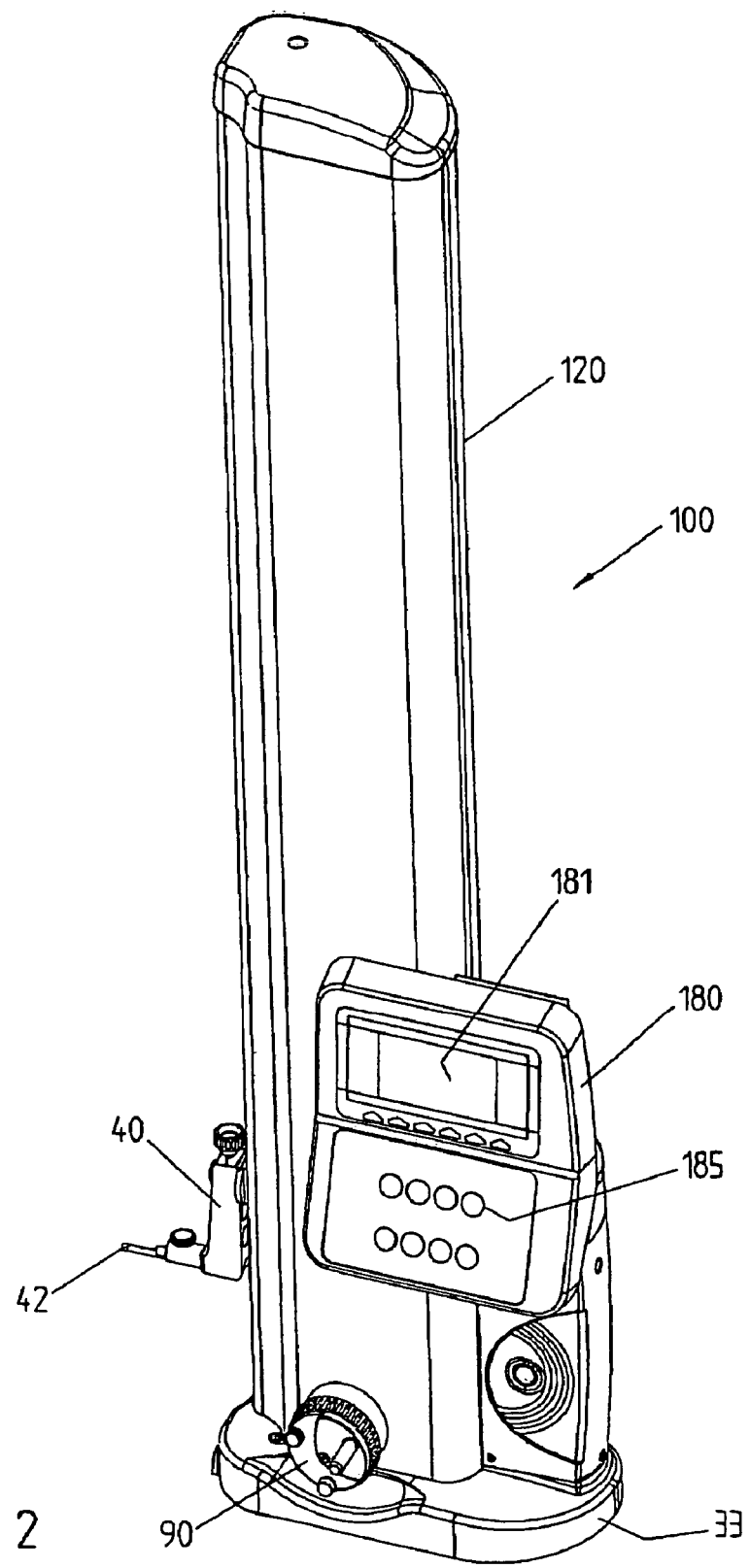
FIG. 2 is a second view of an inventive height gauge with a housing.

FIG. 2 shows a second view of an inventive length measuring device with a housing 120. While the guide 20 is covered by the housing 120, the measuring head 40 is placed outside the housing 120 and connected with the carriage 35 through a longitudinal opening 121 of the housing 120. The crank 90 and the table console 180 are also visible. The table console 180 has a display 181 and an operating panel 185. The table console 180 has a housing that protects very well against water and other liquids or that can be fully watertight. The connections of the table console 180 are advantageously led through the foot 33 into the inside of the housing 120, so that no further openings are necessary in the housing.

In FIG. 2, the crank 90 is also visible outside the housing 120. The connections of this crank 90 are either led through the foot 33 inside the housing 120 and/or to an available table console 180, so that also here, no further openings are necessary in the housing.

The housing 120 is advantageously made of one single piece and fastened only at the foot 33 of the length measuring device 100, so that external shocks are not transmitted directly inside. In fastened state, as can be seen in FIG. 3, the housing 120 merely has one opening 121.

Figure 3:
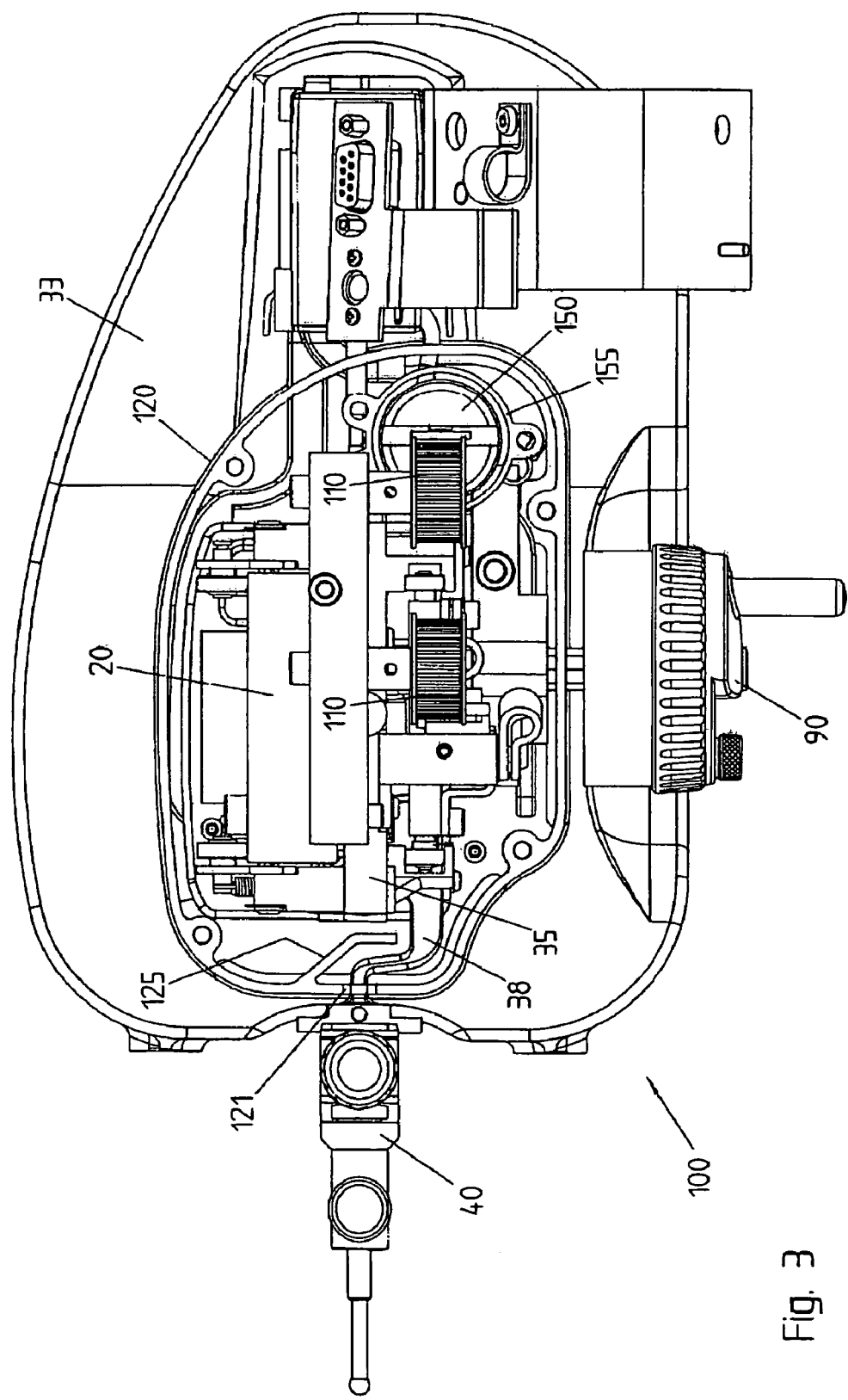
FIG. 3 is a view of an inventive height gauge according to FIG. 2 above, wherein the housing is sliced open.

FIG. 3 shows a view of an inventive length measuring device according to FIG. 2 above, the housing 120 being sliced open and the individual parts of the guide inside the housing 120 are represented. The carriage 35 and the upper guiding rolls 110 are well visible.

According to the invention, a baffle 125 is placed behind the opening 121 of the housing 120 inside the housing 120. The obstacle resp. the baffle 125, itself connected with the housing 120, prevents the penetration of oil, water and dirt from outside. The shape of the baffle 125 is in principle arbitrary, as long as the purpose is fulfilled that the longitudinal opening 120 and the guide 20, the rule 22 and the carriage 35 are separated from one anther and dirt entering through the opening 120 remains stuck on the baffle 125 and cannot affect the mechanism and the optics.

Since the direct and straight route between the measuring head 40 and the carriage 35 is blocked by the baffle 125, the connecting arm 38 has a curved shape of an S. The movements of the carriage 35 can thus be transmitted to the measuring head 40 without the baffle 125 being disturbing.

For further protection, the carriage 35 inside the housing 120 of the length measuring device can have an additional housing.

REFERENCE LIST

20 Guide
22 Rule
33 Foot
35 Carriage
38 Curved arm
40 Measuring head
42 Probe lever
90 Crank
100 Length measuring device
110 Rolls
120 Housing
121 Opening
125 Baffle, obstacle
130 Driving belt
150 Counter-weight
155 Guiding conduit of the counterweight 150
180 Table console
181 Display
185 Operation panel

The invention claimed is:

1. A vertical length measuring device comprising
a vertical guide,
at least one carriage that is led vertically by the guide,
a driving organ for the at least one carriage,
a housing that is placed around the vertical guide, the carriage and the driving organ and that has a longitudinal opening, and is fastened at a foot of the length measuring device, and
a measuring head placed outside the housing and connected with the at least one carriage through the opening through the housing,
characterized in that
behind the opening of the housing inside the housing, a baffle is placed that prevents penetration of oil, water and dirt from outside.

2. The length measuring device of claim 1, wherein between the measuring head outside the housing and the at least one carriage inside the housing, there is an arm having a curved shape adapted to the baffle.

3. The length measuring device of claim 1, wherein the housing in fastened state has only one opening.

4. The length measuring device of claim 1, wherein the housing is fastened on the foot.

5. The length measuring device of claim 1, wherein the carriage inside the housing of the length measuring device has an additional housing.

6. The length measuring device of claim 1, wherein there is a table console with a display for displaying the measuring results, the table console has a housing and the housing of the table console is watertight.

7. The length measuring device of claim 6, wherein the connections of the table console is led through the foot inside the housing.

8. The length measuring device of claim 1, wherein the length measuring device has a crank and the connections of this crank are led through the foot inside the housing and/or to an available table console.

9. The length measuring device of claim 1, wherein the housing is fastened only to the foot of the length measuring device.

10. The length measuring device of claim 1, wherein the housing is of one piece.

* * * * *